United States Patent
Moon et al.

(10) Patent No.: US 7,069,033 B1
(45) Date of Patent: Jun. 27, 2006

(54) DEVICE AND METHOD FOR CONTROLLING TRANSMISSION ON REVERSE LINK IN MOBILE COMMUNICATION SYSTEM

(75) Inventors: Hi-Chan Moon, Seoul (KR); Jong Yoon Hwang, Seoul (KR); Jee-Min Ahn, Kangnam gu (KR); Soung-Joo Maeng, Songnam-shi (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 09/503,765

(22) Filed: Feb. 14, 2000

(30) Foreign Application Priority Data

Feb. 13, 1999 (KR) .................................. 1999-5274

(51) Int. Cl.
*H04Q 7/20* (2006.01)
(52) U.S. Cl. ................ 455/522; 455/67.11; 455/67.13; 455/115.3; 455/226.2; 455/226.3
(58) Field of Classification Search ................. 455/69, 455/70, 522, 423, 424, 425, 63, 67.1, 67.3, 455/226.1–226.4, 572, 574, 115, 63.1–63.2, 455/115.1, 343.1–343.2, 504; 370/335, 342, 370/311
See application file for complete search history.

(56) References Cited

U.S. PATENT DOCUMENTS

| | | | | |
|---|---|---|---|---|
| 5,444,862 A | * | 8/1995 | Hibino | 455/504 |
| 5,491,717 A | * | 2/1996 | Hall | 370/332 |
| 5,794,148 A | * | 8/1998 | Mamaghani et al. | 455/435 |
| 6,169,909 B1 | * | 1/2001 | Koshino | 455/557 |
| 6,208,873 B1 | * | 3/2001 | Black et al. | 455/522 |
| 6,347,231 B1 | * | 2/2002 | Miya | 455/522 |
| 6,466,794 B1 | * | 10/2002 | Posti et al. | 455/450 |
| 6,539,008 B1 | * | 3/2003 | Ahn et al. | 370/342 |
| 6,542,488 B1 | * | 4/2003 | Walton et al. | 370/335 |
| 2002/0082019 A1 | * | 6/2002 | Sunay et al. | 455/442 |

FOREIGN PATENT DOCUMENTS

| | | |
|---|---|---|
| JP | 09-233218 | 5/1997 |
| JP | 10-190591 | 7/1998 |
| JP | 11-008878 | 12/1999 |

OTHER PUBLICATIONS

Japanese Office Action dated Sep. 24, 2003 issued in a counterpart application, namely, Appln. No. 2000-599146.
Japanese Office Action dated May 20, 2003, issued in a counterpart application, namely, Appln. No. 2000-599146.

* cited by examiner

Primary Examiner—Temica Beamer
(74) Attorney, Agent, or Firm—Dilworth & Barrese LLP

(57) ABSTRACT

A device and method for controlling communication on a reverse link in a mobile communication system includes a measurer, a controller, and a reverse link transmitter according to an embodiment of the present invention. The measurer detects a power control bit from a channel signal received on a forward link and measures the reception strength of the channel signal using the detected power control bit. The controller compares the reception strength with a threshold and generates a signal for controlling transmission on a reverse link if the channel status of the forward link is determined to be bad during the comparison. The reverse link transmitter stops channel transmission on the reverse link in response to the transmission control signal.

15 Claims, 9 Drawing Sheets

DEVICE AND METHOD FOR CONTROLLING TRANSMISSION ON REVERSE LINK IN MOBILE COMMUNICATION SYSTEM

BACKGROUND OF THE INVENTION

1. Field of the Invention

The present invention relates generally to a reverse link communication device and method, and in particular, to a device and method for controlling transmission on a reverse link on the basis of a received signal strength on a forward link.

2. Description of the Related Art

A mobile communication system controls transmission/reception according to changes in channel environment to maintain system stability. To do so, a mobile station controls transmission on a reverse link by checking the status of a forward link. FIG. 1 is a block diagram of a conventional device for controlling reverse link communication by determining the status of a forward link in a mobile communication system. Here, the mobile communication system is assumed to be a CDMA (Code Division Multiple Access) communication system.

Referring to FIG. 1, an RF (Radio Frequency) module 111 down-converts the frequency of an RF signal received through an antenna to a baseband frequency. A receiver 113 despreads the baseband signal received from the RF module 111, accumulates the despread signal in symbol units, and determines the level of the accumulated symbols. Here, the despreading includes PN despreading and orthogonal despreading. A decoder 115 decodes the symbols received from the receiver 113. A CRC (Cyclic Redundancy Check) detector 117 generates a CRC detection signal indicating the presence or absence of frame errors, for the input of the decoded symbols. A controller 119 receives the output of the CRC detector 117 and generates a signal for controlling reverse link transmission. A transmitter 121 is a reverse link channel transmitter of which the transmission is controlled by the control signal received from the controller 119.

As shown in FIG. 1, the conventional reverse link transmission controlling method controls transmission on the reverse link by calculating a CRC in a frame. If the CRC detector 117 detects CRC errors in more than a predetermined number of successive frames, the controller 119 generates a control signal for controlling the transmitter 121 to stop reverse link transmission. In other words, if frames are determined to be damaged through the CRC error check, the channel environment of a forward link is assumed to be bad and transmission on the reverse link is suspended.

The above conventional method can be adapted only to a frame data transmission period on the forward link channel. Therefore, a CRC error check is useless during a non-frame data transmission period on the forward link, for example, in a discontinuous transmission (DTX) mode using channel. Accordingly, a need exists to control reverse link transmission during a non-transmission period by checking the channel status of the forward link as observed on a DTX mode using channel.

SUMMARY OF THE INVENTION

It is, therefore, an object of the present invention to provide a mobile station device for controlling transmission on a reverse link based on the reception strength of a forward link channel and a method thereof in a mobile communication system.

It is another object of the present invention to provide a mobile station device for controlling transmission on a reverse link based on the SNR (Signal-to-Noise Ratio) of a power control command received on a forward link channel and a method thereof in a mobile communication system.

It is a further object of the present invention to provide a mobile station device for controlling transmission on a reverse link based on the reception strength of a forward link channel received in a DTX mode and a method thereof in a mobile communication system.

It is still another object of the present invention to provide a mobile station device for dropping a call if the status of a forward link is determined to be bad and a method thereof in a mobile communication system.

Briefly, these and other objects can be achieved by providing a device and method for controlling communication on a reverse link in a mobile communication system. According to one aspect of the present invention, a mobile device for controlling reverse link transmission includes a detector or measurer, a controller, and a reverse link transmitter. The detector detects a power control bit from a channel signal received on a forward link and measures the reception strength of the channel signal using the detected power control bit. The controller compares the reception strength with a threshold and generates a signal for controlling transmission on a reverse link if the channel status of the forward link is determined to be bad via the comparison. The reverse link transmitter stops channel transmission on the reverse link in response to the transmission control signal.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will be described hereinbelow with reference to the accompanying drawings. In the following description, well-known functions or constructions are not described in detail to avoid obscuring the invention in unnecessary detail.

Specific details regarding suspending transmission and resuming reverse link transmission based on a received channel signal strength measurement, or averaged reception strengths, are provided in the following description for comprehensive understanding of the present invention. Thus, it is obvious that many variations can be made to the details by anyone skilled in the field within the scope and spirit of the present invention. While a received signal strength is measured using a power control bit in embodiments of the present invention, it can be measured using another signal available while data transmission is suspended.

In the following description, the term "forward link" refers to a link directed from a base station to a mobile station and "reverse link" refers to a link directed from a mobile station to a base station.

Figure 1:
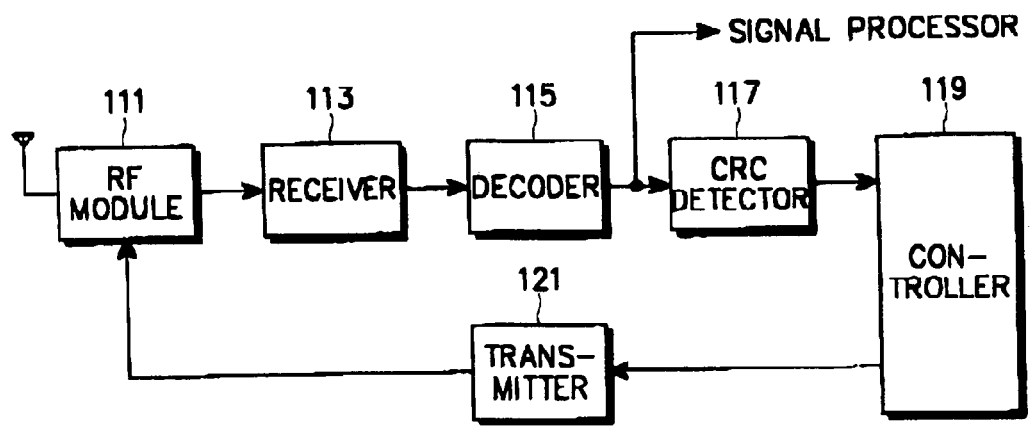
FIG. 1 is a block diagram of a conventional reverse link transmission controlling device in a mobile communication system.
Figure 2:
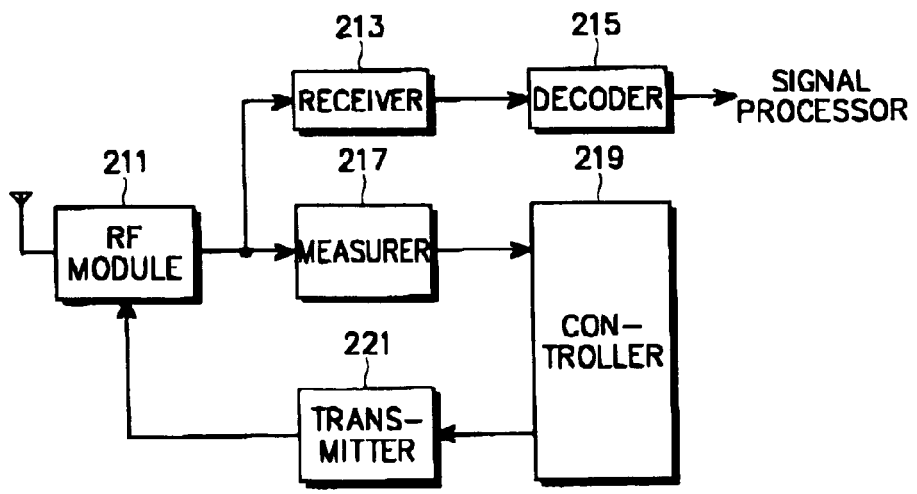
FIG. 2 is a block diagram of a reverse link transmission controlling device in a mobile communication system according to an embodiment of the present invention.

FIG. 2 is a block diagram of a reverse link communication device according to an embodiment of the present invention.

Referring to FIG. 2, an RF module 211 down-converts the frequency of an RF signal received through an antenna to a baseband frequency. A receiver 213 despreads the baseband signal received from the RF module 211, accumulates the despread signal in symbol units, and determines the level of the accumulated symbols. Here, the despreading includes PN despreading and orthogonal code despreading. A decoder 215 decodes the symbols received from the receiver 213. A measurer 217 detects power control bits (PCBs) from the forward link signal received from the RF module 211 and measures the SNR of the PCBs. A controller 219 analyzes the SNR of the PCBs received from the measurer 217 and generates a signal for controlling reverse link transmission. A transmitter 221 is a reverse link channel transmitter of which the transmission is controlled by the control signal received from the controller 219.

In accordance with the reverse link communication device of the present invention, an SNR is measured using PCBs received on a forward link channel and it is determined whether to transmit data on a reverse link or not based on the SNR. The SNR of PCBs can be measured on either a continuous transmission mode channel or a DTX mode channel, since both the channels continuously transmit PCBs.

Figure 3:
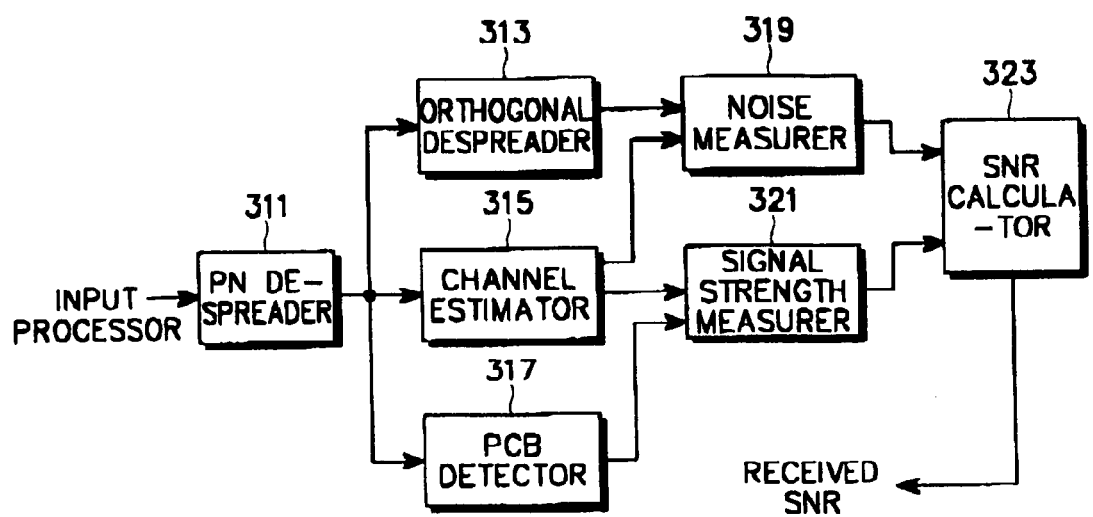
FIG. 3 is a block diagram of a measurer shown in FIG. 2.

FIG. 3 is a detailed block diagram of the measurer 217 shown in FIG. 2.

Referring to FIG. 3, a PN despreader 311 despreads a received forward link signal with a PN sequence. An orthogonal despreader 313 despreads the PN-despread signal with a corresponding channel orthogonal code. The orthogonal code may be a Walsh code and the channel may be a pilot channel. A channel estimator 315 generates a channel estimation signal, for the input of the PN-despread signal. A PCB detector 317 detects PCBs from the PN-despread signal. A noise measurer 319 detects noise components (Nt) from the outputs of the orthogonal despreader 313 and the channel estimator 315. The noise measurer 319 combines the noise components of the orthogonal despreader 313 and the output of the channel estimator 315 using equation (2) below, where the output of the orthogonal despreader 313 is (P(t)−P(t−1)) and the output of the channel estimator 315 is (P(t)×P*(t)). A signal strength measurer 321 measures bit energy (Eb) from the outputs of the channel estimator 315 and the PCB detector 317. An SNR calculator 323 receives the noise components Nt from the noise measurer 319 and the signal strength Eb from the signal strength measurer 319 and generates an SNR by calculating Eb/Nt.

In FIG. 3, the PN-despread signal is divided into the Walsh-despread pilot channel and the PCBs-including channel. Then, the noise measurer 319 measures the noise components Nt from the Walsh-despread pilot channel signal and the output of the channel estimator 315 and the signal strength measurer 321 measures the signal strength Eb from the magnitude of the PCBs detected at the output of the PCB detector 317 and the output of the channel estimator 315. Then, the SNR calculator 323 generates the SNR using the relationship Eb/Nt.

Figure 4:
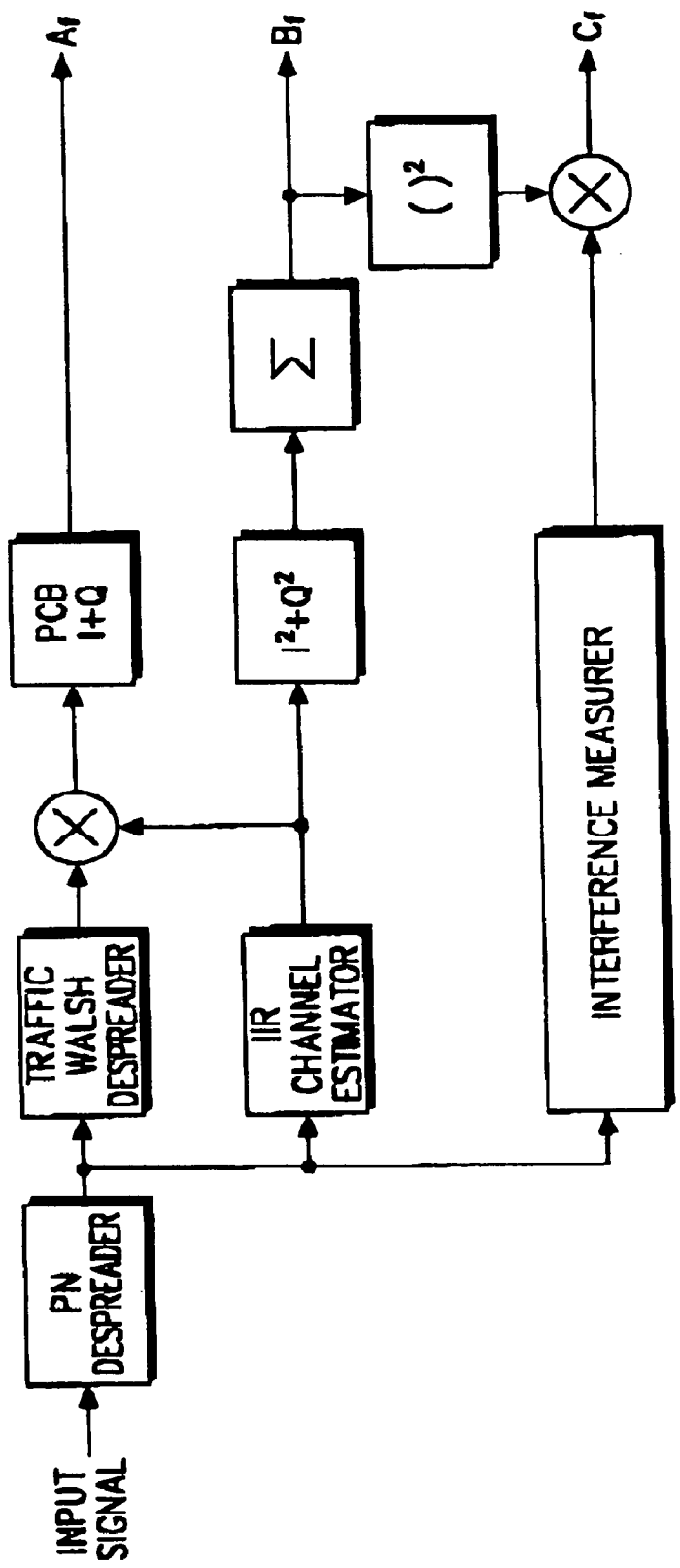
FIG. 4 is a detailed block diagram of an SNR calculator shown in FIG. 3.

FIG. 4 illustrates an exemplary procedure of measuring the SNR of a received signal in the mobile station receiver shown in FIG. 3.

$$A = \sum_{finger} A_f \quad B = \sum_{finger} B_f \quad C = \sum_{finger} C_f$$

$W_i$: a power control command $$\frac{E_b}{N_t} = \left[\sum_{i=1}^{N} W_i \frac{A_i}{B_i}\right]^2 \times \frac{B^3}{C}$$

in an ith power control group (PCG) reversely transmitted.

$$\frac{E_{b\_full}}{E_{pilot}} = \left\{\sum^{j-3} W_i \left(\frac{\left[\sum_{finger} \sum_{PCG} C(t) \times P^*(t)\right]^2}{\sum_{finger} P(t) \times P^*(t)}\right)\right\} \quad (1)$$

$$N_t(t) = \frac{\sum_{finger} |P(t) - P(t-1)|^2 \cdot \{P(t) \cdot P^*(t)\}^2}{\left[\sum_{finger} P(t) \cdot P^*(t)\right]^2} \quad (2)$$

$$\frac{E_b}{N_t} = \frac{E_{b\_full}}{E_{pilot}} \cdot \frac{1}{N_t(t)} E_{pilot} \quad (3)$$

If $$\sum_{PCG} C(t) \cdot P^*(t)$$

of Eq. 1 is $A_f$ and $$\sum_{PCG} P(t) \cdot P^*(t)$$

of Eq. 1 and 2 is $B_f$, $$\sum_{PCG} |P(t) - P(t-1)|$$

is interference. Therefore, the numerator in Eq. 3 is $C_f$ and a received SNR can be expressed as $$\frac{E_b}{N_t} = \left[\sum_i W_i \cdot \frac{A_i}{B_i}\right]^2 \cdot \frac{B^2}{C} \cdot B \qquad (4)$$

Figure 5:
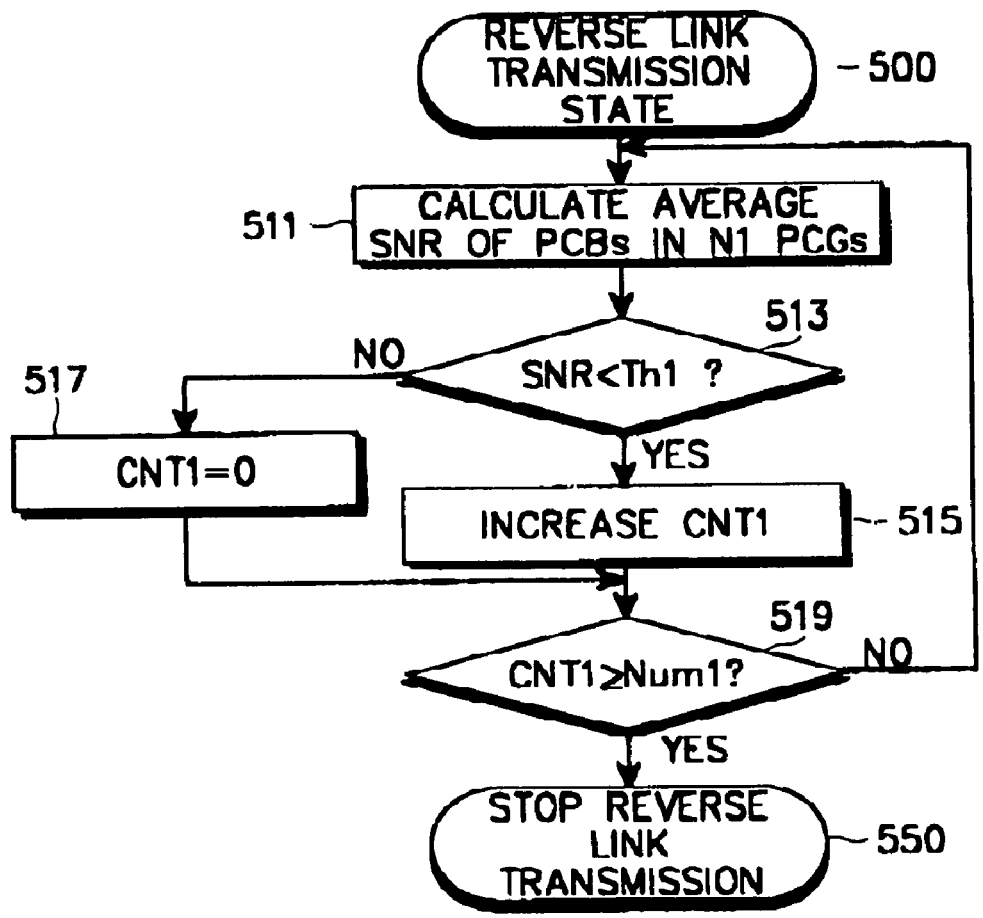
FIG. 5 is a flowchart illustrating an embodiment of a reverse link transmission suspending procedure according to the present invention.

FIG. 5 is a flowchart illustrating an embodiment of a procedure of measuring the SNR of PCBs received on a forward link during a communication and stopping transmission on a reverse link if the SNR indicates a bad channel status of the forward link in a mobile communication system according to the present invention.

Referring to FIG. 5, the mobile station device normally transmits on a reverse link in step 500. In this state, the controller 219 outputs a control signal for activating the transmitter 221 and the transmitter 221 transmits corresponding channel information on the reverse link under the control of the controller 219. In step 511, the controller 219 receives SNRs from the SNR calculator 323 and takes an average of the SNRs. The average SNR is obtained by accumulating the SNRs of PCBs in N1 PCGs. Here, N1 is a reception period for measuring an SNR and can be a frame period. In this case, N1 can be 16 PCGs.

Then, the controller 219 compares the average SNR with a predetermined threshold Th1 in step 513. If the SNR is smaller than Th1, which implies that the forward link channel status is bad for N1, the value CNT1 of a counter is incremented in step 515. If the SNR is not smaller than Th1, CNT1 is set to an initial value 0 in step 517. The counter counts the number of reception periods in a bad forward link channel status, that is, the number of reception periods for which the received channel signal strengths are smaller than Th1.

After step 515 or 517, the controller 219 compares CNT1 with a predetermined number NUM1 of successive frames in step 519. If CNT1 is smaller than NUM1, which implies that the channel status is bad for fewer reception periods than the predetermined number, the procedure returns to step 511. If CNT1 is not smaller than NUM1, which implies that channel status is bad for the predetermined number of or more reception periods during the reverse link transmission, the controller 219 generates a transmission control signal for stopping the transmission of the transmitter 221. Then, the transmitter 221 stops transmission of the corresponding channel transmission signal in step 550.

As shown in FIG. 5, the mobile station measures an SNR in each of N1 PCGs in a received signal and averages the measured SNRs. If the average SNR is smaller than Th1, CNT1 is incremented. If the average SNR is not smaller than Th1, CNT-1 is set to 0. Then, if CNT1 is not smaller than NUM1, which implies that the average SNR is smaller than Th1 successively over NUM1 frames, the reverse link transmission is suspended. Alternatively, if CNT1 is smaller than NUM1, the average SNR of the next N1 PCGs is calculated and the above procedure is repeated. If the received channel status is determined to be bad continuously over NUM1 frames, the transmission on the reverse link is stopped. Here, Th1, N1, and NUM1 are first reference values.

Figure 6:
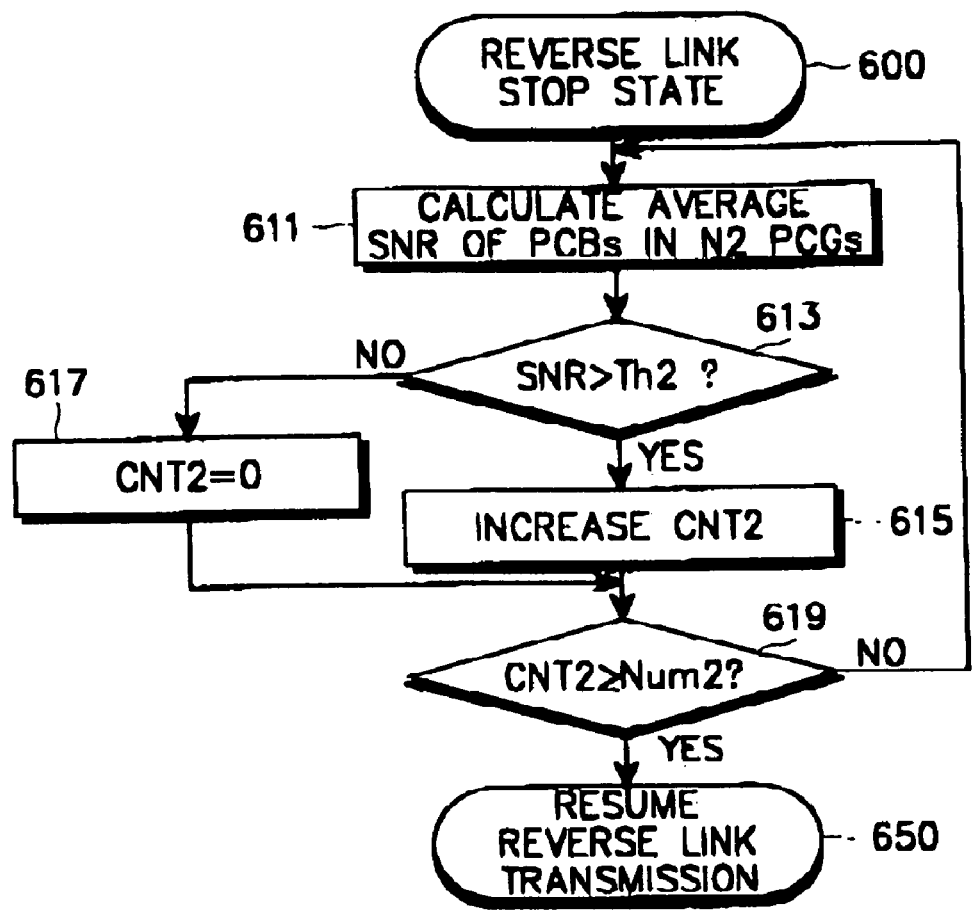
FIG. 6 is a flowchart illustrating an embodiment of a reverse link transmission resuming procedure according to the present invention.

FIG. 6 is a flowchart illustrating an embodiment of a procedure of measuring the SNRs of PCBs on a forward link in the reverse link transmission suspended state in the mobile communication system after the procedure shown in FIG. 5 and resuming the reverse link transmission if the status of a received channel is determined to be good based on the measured SNRs.

Referring to FIG. 6, the mobile station is kept in the reverse link transmission suspended state in step 600. In this step, the controller 219 outputs the transmission control signal for disabling the transmitter 221 and the transmitter 221 stops transmitting corresponding channel information under the control of the controller 219. In step 611, the controller 219 receives the SNRs of PCBs for N2 PCGs from the SNR calculator 323 and takes an average of the SNRs. N2 is a reception period for measuring an SNR and can be a frame period. In this case, N2 can be 16 PCGs.

Then, the controller 219 compares the average SNR with a predetermined threshold Th2 in step 613. If the SNR is greater than Th2, the count value CNT2 of a counter is incremented in step 615. If the SNR is not greater than Th2, CNT2 is set to an initial value 0 in step 617. The counter counts the number of reception periods during a good forward link channel status, that is, the number of receipts of a signal with an SNR greater than Th2.

After step 615 or 617, the controller 219 compares CNT2 with a predetermined number NUM2 of successive frames in step 619. If CNT2 is smaller than NUM2, which implies that the forward link channel status is good in successive frames of less than NUM2, the procedure returns to step 611. If CNT2 is not smaller than NUM2, which implies that the forward link channel status is good in more successive reception periods than NUM2 in the reverse link transmission suspended state, the controller 219 generates a transmission resuming signal for resuming the transmission of the transmitter in step 650. Then, the transmitter 221 resumes the transmission of a corresponding channel on the reverse link.

In the procedure shown in FIG. 6, the SNRs of PCBs in N2 received PCGs are measured and averaged. If the average SNR is greater than Th2, CNT2 is incremented. If the average SNR is not greater than Th2, CNT is set to an initial value 0. If CNT2 is not smaller than NUM2, which implies that the SNR is not continuously less than Th2 for NUM2, reverse link transmission is resumed. However, if CNT is smaller than NUM2, the average SNR of PCBs in the next N2 PCGs is measured and compared with NUM2 again. When the receiver determines that the reception channel status is good for NUM2, it resumes the reverse link transmission. Here, Th2, N2, and NUM2 are second reference values.

Figure 7:
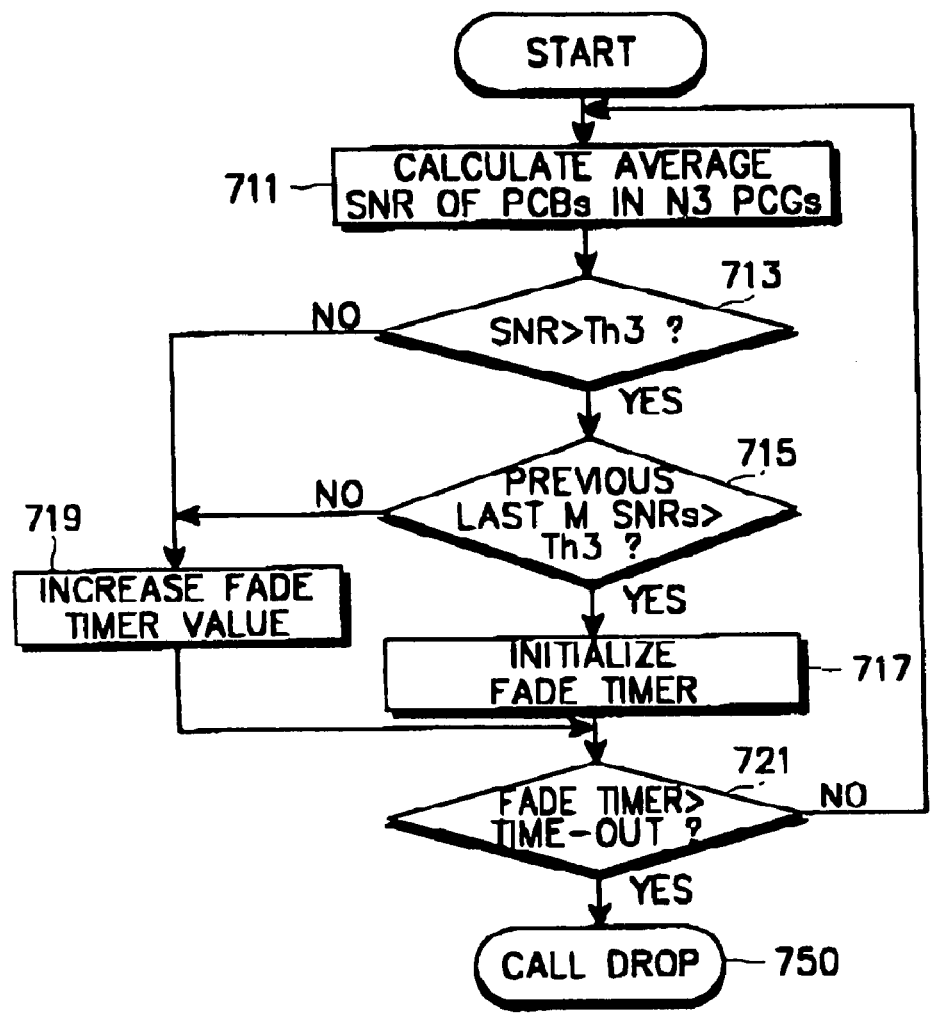
FIG. 7 is a flowchart illustrating an embodiment of a procedure of dropping a call on a reverse link in a reverse link transmission suspended state according to the present invention.

FIG. 7 is a flowchart illustrating a procedure of dropping a call when a channel status is determined to be bad as a result of measurement of the SNRs of PCBs received on a forward link in a mobile communication system according to the embodiment of the present invention.

Referring to FIG. 7, the controller 219 receives the SNRs of PCBs in N3 PCGs from the SNR calculator 323 and takes an average of the SNRs in step 711. N3 is a reception period for measuring an SNR and can be a frame period. In this case, N3 can be 16 PCGs.

Then, the controller 219 compares the average SNR with a predetermined threshold Th3 in step 713. If the SNR is greater than Th3, the procedure goes to step 715. If the SNR is not greater than Th3, the procedure goes to step 719. In step 715, the controller 219 checks whether all of the previous M SNRs are Th3 or greater. If they are all Th3 or greater, a fade timer is initialized in step 717. Otherwise, the value of the fade timer is incremented in step 719. That is, the fade timer is initialized if the current SNR is greater than Th3 and the previous M SNRs are all Th3 or greater. If the current SNR is not greater than Th3 or at least one of the previous M SNRs is smaller than Th3, the count of the fade timer is incremented in step 719.

After step 717 or 719, the controller 219 determines whether the fade time has expired in step 721. If the fade timer does not time out, the controller 219 returns to step 721. Upon expiration of the time-out period, the controller 219 drops a call in step 750.

In the procedure shown in FIG. 7, if it is determined that the status of a channel received at the mobile station is bad for the predetermined time (the value of the fade timer), the link is released. First, the controller 219 measures the SNRs of PCBs in N3 received PCGs and averages them. If the average SNR is greater than Th3 and the last previous M SNRs are all Th3 or greater, the fade timer is initialized. If the average SNR is not greater than Th3 or at least one of the M SNRs is smaller than Th3, the fade timer is increased. If the fade timer expires, the channel status is considered to be very bad and the link is released. If the average SNR of N3 PCGs is not greater than Th3 for M period, the call is dropped.

In FIGS. 5, 6, and 7, a measured SNR is compared with a threshold Th for determining a channel status on a forward link. Instead of the threshold, a frame error probability can be used to check the forward link channel status. To detect the frame error probability, a frame detector should be used to detect a frame error from a despread channel signal.

For calculation of a frame error probability, a frame error detector (not shown) calculates a real SNR (Eb/Nt) by adding an offset value to an SNR obtained by dividing the noise component Nt detected from additive white Gaussian noise (AWGN) by the noise measurer 319 into the bit energy Eb received from the signal strength measurer 321. On the assumption that the SNR of each frame is approximate to the SNR in the AWGN, a frame error rate corresponding to the measured SNR is obtained referring to a preset look-up table. In this case, since the real SNR can be different from the SNR in the look-up table, the difference is compensated for. The compensated value is preset or received from a transmitter in advance.

Then, the frame error detector reads a frame error rate corresponding to the SNR from the look-up table and stores it in a buffer. The look-up table lists FERs with respect to Eb/Nts. Here, SNRs can be tabulated at predetermined intervals or FERs can be listed at irregular intervals. After reading the frame error rate, the frame error detector activates a random number generator to generate a random number. Upon receipt of the random number, the frame error detector compares the frame error rate with the random number. If the random number is smaller than the frame error rate, the frame error detector outputs 1 as a frame error message. If the random number is greater than the frame error rate, the frame error detector outputs 0 as the frame error message.

Figure 8:
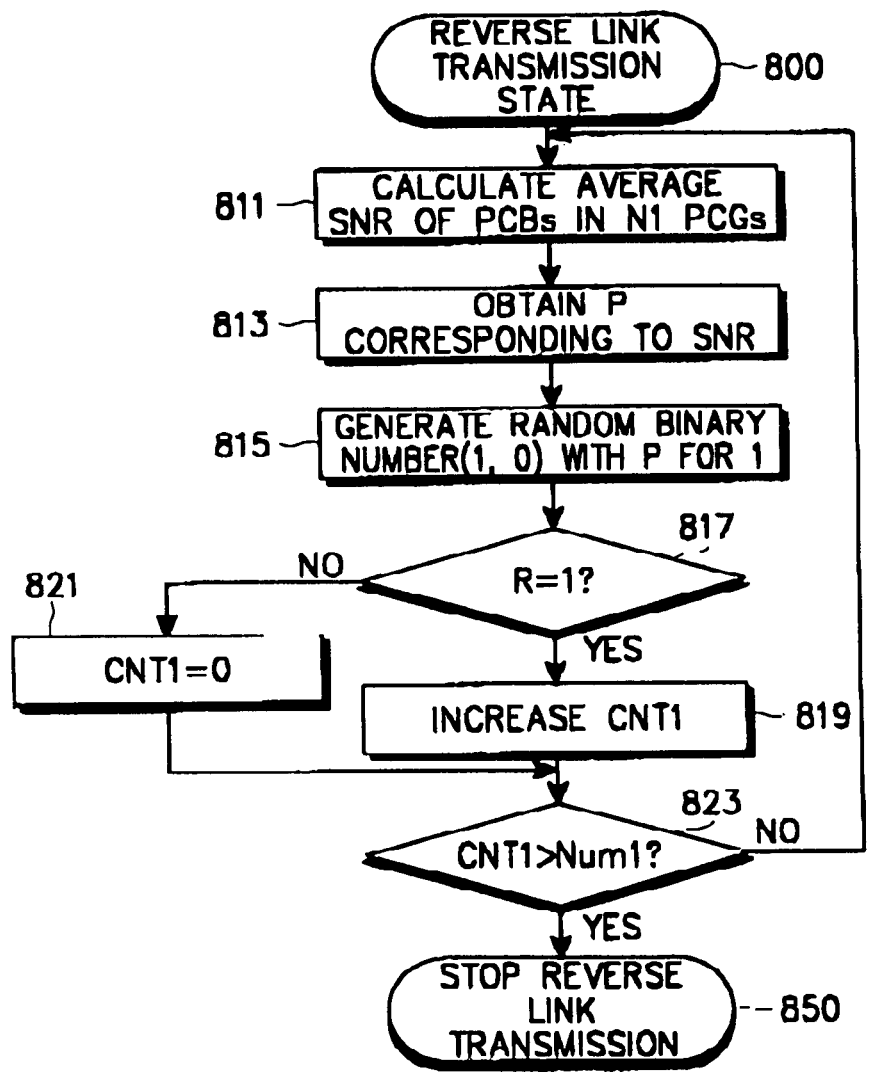
FIG. 8 is a flowchart illustrating another embodiment of the reverse link transmission suspending procedure according to the present invention.
Figure 9:
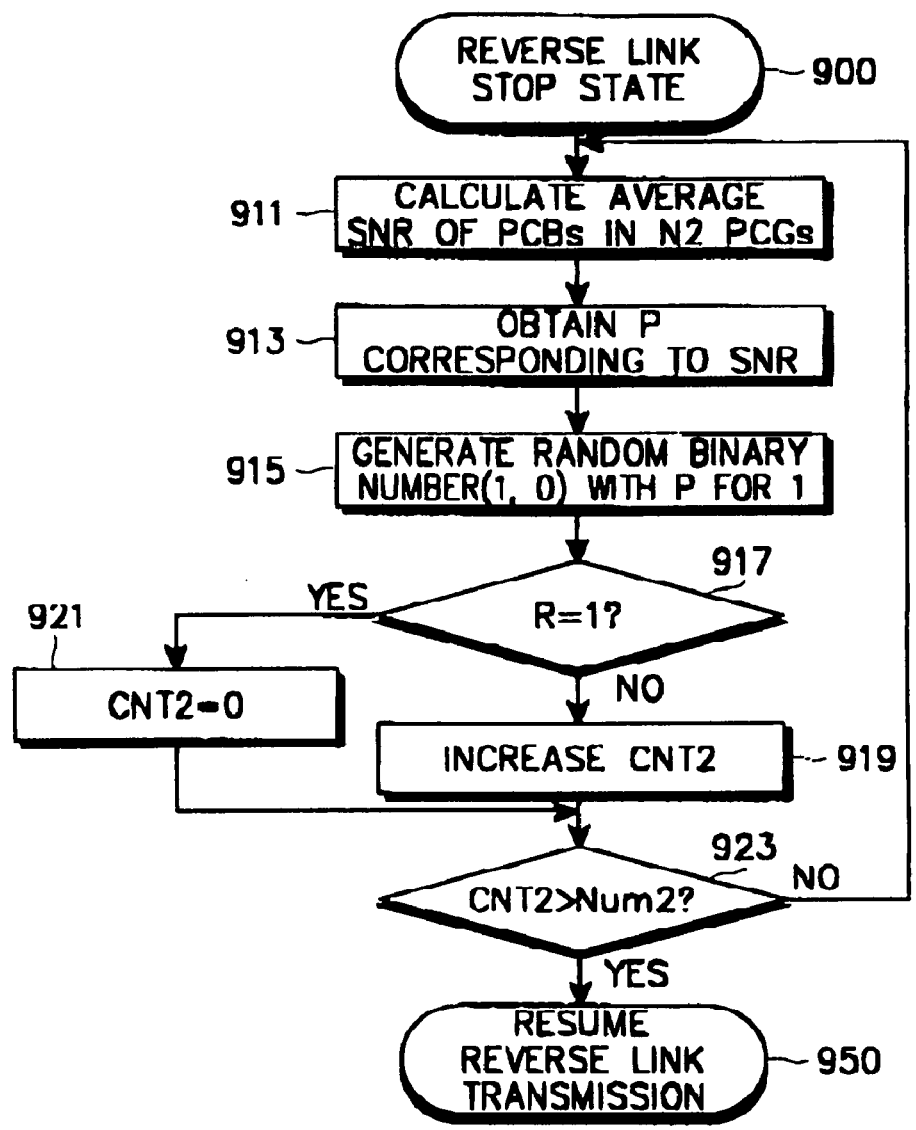
FIG. 9 is a flowchart illustrating another embodiment of the reverse link transmission resuming procedure according to the present invention.
Figure 10:
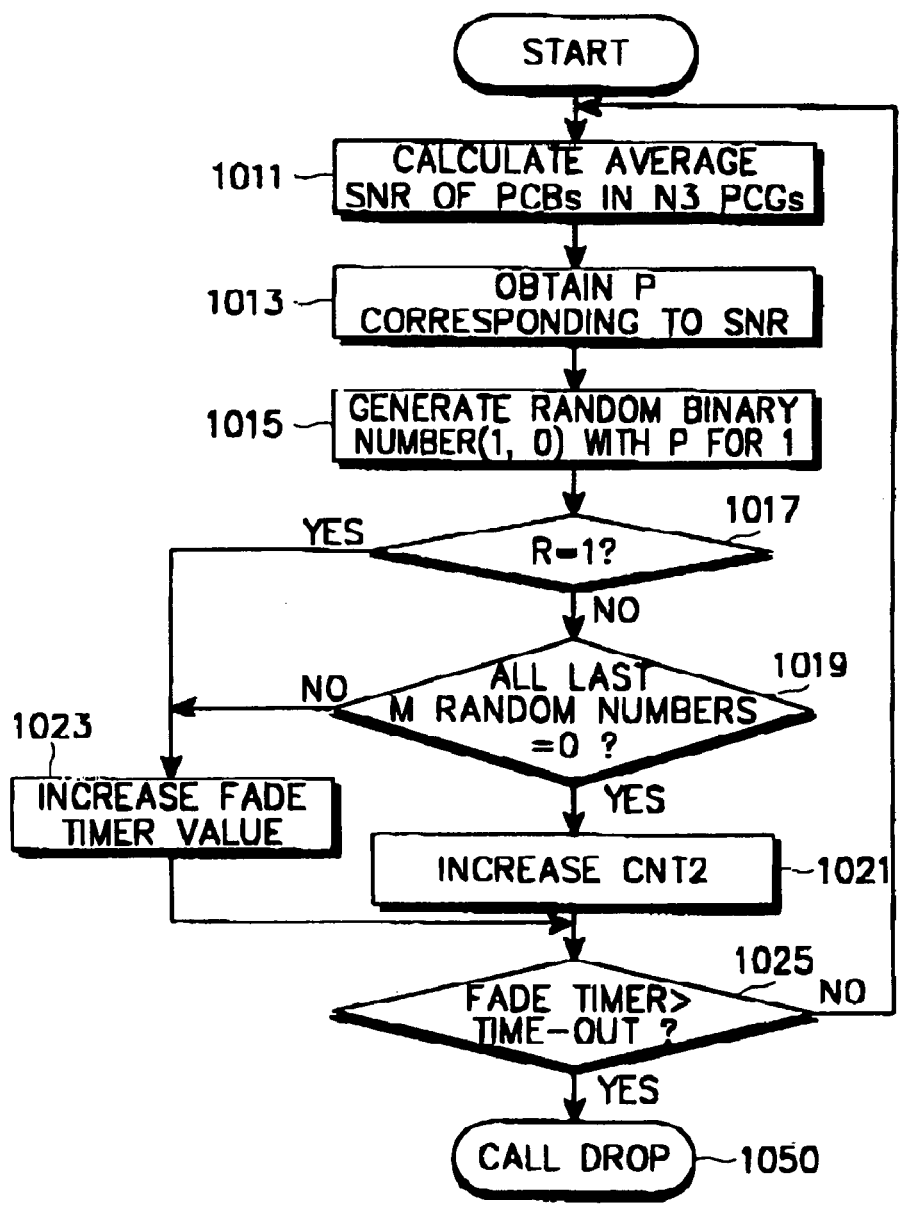
FIG. 10 is a flowchart illustrating another embodiment of the call dropping procedure on the reverse link in a reverse link transmission suspended state according to the present invention.

FIGS. 8, 9, and 10 illustrate a reverse link controlling method in which an error probability is used instead of the threshold Th.

FIG. 8 is a flowchart illustrating a procedure of controlling a reverse link based on a received signal strength measurement in a reverse link transmission state. The procedure is performed in the same manner as in FIG. 5 except that Th1 is replaced by a random number R depending on an error probability P.

In FIG. 8, an SNR in each of N1 PCGs is measured and the measured SNRs are averaged in step 811. Then, the error probability corresponding to the average SNR is obtained in step 813 and a random binary number (1, 0) with P being the probability of 1 is generated in step 815. If the random number is 1 in step 817, it is determined that a frame error has occurred and CNT1 is increased in step 819. If the random number is 0 in step 817, it is determined that the reception status of frames is good and CNT1 is set to an initial value in step 821. If CNT1 is greater than NUM1 in step 823, it is determined that errors are present in NUM1 successive frames and transmission is stopped on the reverse link in step 850.

FIG. 9 is a flowchart illustrating a procedure of resuming transmission on the reverse link based on measured received signal strengths in a reverse link transmission suspended state. The procedure is performed in the same manner as in FIG. 6 except that Th2 is replaced by the random number R depending on the error probability P.

In FIG. 9, an SNR in each of N2 PCGs is measured and the measured SNRs are averaged in step 911. Then, the error probability P corresponding to the average SNR is obtained in step 913 and a random binary number (1, 0) with P being the probability of 1 is generated in step 915. If the random number is 1 in step 917, it is determined that a frame error has occurred and CNT2 is increased in step 919. If the random number is not 1 in step 917, it is determined that the reception status of frames is good and CNT2 is set to an initial value in step 921. If CNT2 is greater than NUM2 in step 923, it is determined that frame status is good in NUM2 successive frames and transmission is resumed on the reverse link in step 950.

FIG. 10 is a flowchart illustrating a procedure of releasing a reverse link if it is determined that the status of a channel received at a receiver is continuously bad for a predetermined time set in a fade timer. The procedure is performed in the same manner as in FIG. 7 except that Th3 is replaced by the random number R depending on the error probability P.

In FIG. 10, an SNR in each of N3 PCGs is measured and the measured SNRs are averaged in step 1011. Then, the error probability P corresponding to the average SNR is obtained in step 1013 and a random binary number (1, 0) with P being the probability of 1 is generated in step 1015. If the random number is 1 in step 1017, it is determined that a frame error has occurred and a fade timer value is increased in step 1023. If the random number is not 1, it is determined that the reception status of frames is good and whether the last previous random numbers are all 0s in step 1019. If any of the M random numbers is 0, it is determined that the status of a received channel is good M successive times and the fade timer is initialized in step 1021. If all of the M random numbers are not 0s, the fade timer is increased in step 1023. If the fade timer expires in step 1025, it is determined that the status of the received channel is very bad for a predetermined time-out period and the link is released. If the frame status is determined to be bad M successive times based on the average SNR of N3 PCGs until the fade timer elapses the time-out period, a call is dropped in step 1050.

In accordance with the present invention as described above, an average SNR of a received forward channel signal is calculated for one frame, for reverse power control in a spread spectrum mobile communication system. If the SNR is not greater than a first threshold for N successive frames, transmission is stopped on a reverse link. Then, if an SNR is not smaller than a second threshold for M successive frames, transmission is resumed on the reverse link. Thus, the whole system is stabilized and system capacity is increased. It can be further contemplated that a frame error probability P and a random number with P for 1 can be utilized instead of the thresholds.

While the conventional method of implementing a reverse power control by checking a channel status through a CRC error check on a previous frame is applied only to a frame transmission period as in a fundamental channel, the present invention can determine whether to transmit a channel on a reverse link by accurately checking the channel status of a forward link using PCBs of the forward link even in the case that frames exist discontinuously and a mobile station does not know the presence or absence of the frames. Therefore, the reverse power control method of the present invention is effective in a DTX mode channel.

Furthermore, when a soft handoff occurs between base stations, a 3-dB increase of the SNR of PCBs on a forward link is detected by checking an HDM (Handoff Directional Message) directed to a mobile station by a base station so that a threshold set to check the forward channel status is adjusted for accurate channel status determination.

In addition, even when a signal is transmitted on a forward link in a gated mode, the accumulation period of a channel estimator is changed according to a gating rate, thereby accurately estimating the forward channel and effectively controlling reverse link transmission.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A mobile station device for controlling transmission in a mobile communication system, comprising:
   a measurer for detecting a power control bit from a channel signal received on a forward link channel, and measuring a reception strength of the received channel signal using the detected power control bit, and determining the measured reception strength as a reception strength of the forward link channel;
   a controller for comparing the reception strength with a threshold and generating a signal for controlling transmission on a reverse link depending on the comparison; and
   a reverse link transmitter for stopping channel transmission on the reverse link in response to the transmission control signal;
   wherein the reception strength of the forward link channel output from the measurer is a signal-to-noise ratio (SNR) calculated using the power control bit.

2. The mobile station device recited in claim 1, wherein the forward link channel is transmitted in a discontinuous transmission mode.

3. The mobile station device recited in claim 1, wherein the controller accumulates values representative of the reception strength for a predetermined period, averages the accumulated values, and generates the transmission control signal if the average value is smaller than the threshold.

4. A mobile station device for resuming communication in a reverse link transmission suspended state in a mobile communication system, comprising:
   a measurer for detecting a power control bit from a channel signal received on a forward link channel and measuring a reception strength of the received channel signal using the detected power control bit;
   a controller for comparing the reception strength with a threshold and generating a signal for resuming transmission on a reverse link depending on the comparison; and
   a reverse link transmitter for resuming channel transmission on the reverse link in response to the transmission resuming signal;
   wherein the reception strength of the forward link channel output from the measurer is an SNR calculated using the power control bit.

5. The mobile station device recited in claim 4, wherein the forward link channel is transmitted in a discontinuous transmission mode.

6. The mobile station device recited in claim 4, wherein the controller accumulates values representative of the reception strength for a predetermined frame period, averages the accumulated values, and generates the transmission resuming signal if the average value is greater than the threshold.

7. A method of controlling communication on a reverse link for a mobile communication system, comprising the steps of:
   detecting a power control bit from a channel signal received on a forward link channel and measuring a reception strength of the received channel signal using the detected power control bit;
   comparing the reception strength with a threshold; and
   stopping transmission on a reverse link by controlling a reverse link channel if the reception strength is determined unacceptable as a result of the comparison;
   wherein the reception strength of the forward link channel output from the measurer is an SNR calculated using the power control bit.

8. The method recited in claim 7, wherein the forward link channel is transmitted in a discontinuous transmission mode.

9. The method recited in claim 7, wherein values representative of the reception strength are accumulated for a predetermined period and the accumulated values are averaged, and a transmission control signal is generated if the average value is smaller than the threshold in the transmission stopping step.

10. A method of resuming communication in a reverse link transmission suspended state in a mobile communication system, comprising the steps of:
   detecting a power control bit from a channel signal received on a forward link channel and measuring a reception strength of the channel signal using the detected power control bit;
   comparing the reception strength with a threshold and resuming transmission on a reverse link by controlling a reverse link channel depending on the comparison;
   wherein the reception strength of the forward link channel output from the measurer is an SNR calculated using the power control bit.

11. The method recited in claim 10, wherein the forward link channel is transmitted in a discontinuous transmission mode.

12. The method recited in claim 10, wherein values representative of the reception strength accumulated for a predetermined frame period and the accumulated values are averaged, and a transmission resuming signal is generated if the average value is greater than the threshold in the transmission resuming step.

13. A method of controlling communication on a reverse link in a mobile communication system, comprising the steps of:

detecting a power control bit from a first channel signal received on a forward link channel and measuring a reception strength of the first channel signal using the detected power control bit;

comparing the reception strength of the first channel signal with a first threshold and stopping transmission on a reverse link by controlling a reverse link channel depending on the comparison;

detecting a power control bit from a subsequent channel signal received on the forward link channel and measuring a reception strength of the subsequent channel signal using the detected power control bit;

comparing the reception strength of the subsequent channel signal with a second threshold and resuming transmission on the reverse link by controlling the reverse link channel depending on the comparison;

wherein the reception strength of the forward link channel is an SNR calculated using the power control bit.

14. The method recited in claim 13, further comprising the step of releasing the reverse link channel and ending the communication if the signal strength of the first channel signal is determined unacceptable more times than a predetermined number for a predetermined time.

15. The method recited in claim 14, further comprising the step of returning to the step of detecting a power control bit from a first channel signal.

* * * * *

UNITED STATES PATENT AND TRADEMARK OFFICE
CERTIFICATE OF CORRECTION

PATENT NO. : 7,069,033 B1 Page 1 of 1
APPLICATION NO. : 09/503765
DATED : June 27, 2006
INVENTOR(S) : Hi Chan Moon et al.

It is certified that error appears in the above-identified patent and that said Letters Patent is hereby corrected as shown below:

Title page, item (75) Inventors:

"Jee-Min Ahn" should be --Jae-Min Ahn--.

"Soung-Joo Maeng" should be --Seung-Joo Maeng--.

Signed and Sealed this

Twelfth Day of December, 2006

JON W. DUDAS
*Director of the United States Patent and Trademark Office*